Feb. 7, 1933. A. P. WISNER 1,896,991
BRAKE
Filed Jan. 24, 1929 2 Sheets-Sheet 1
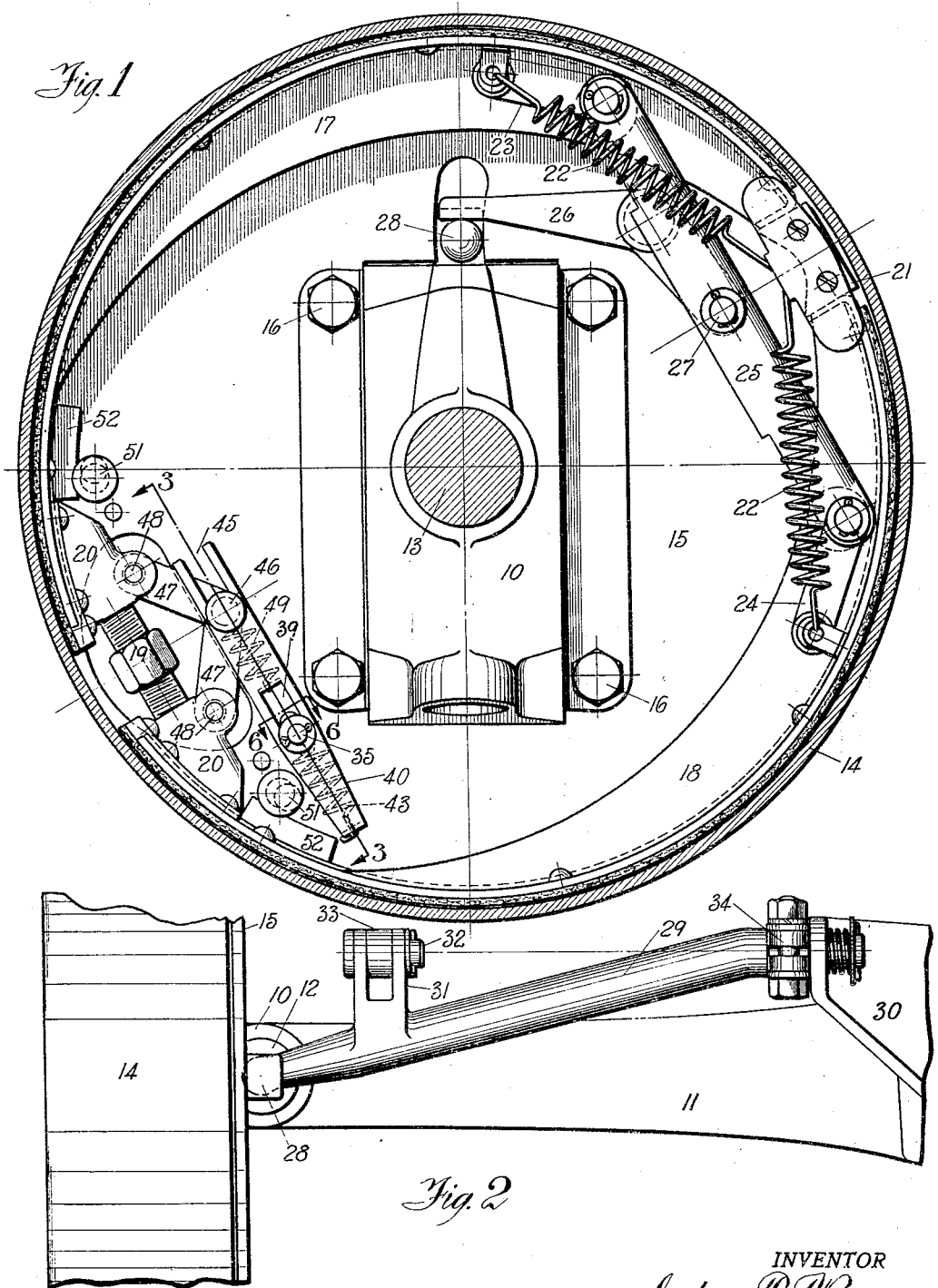
INVENTOR
Andrew P. Wisner
BY
ATTORNEY

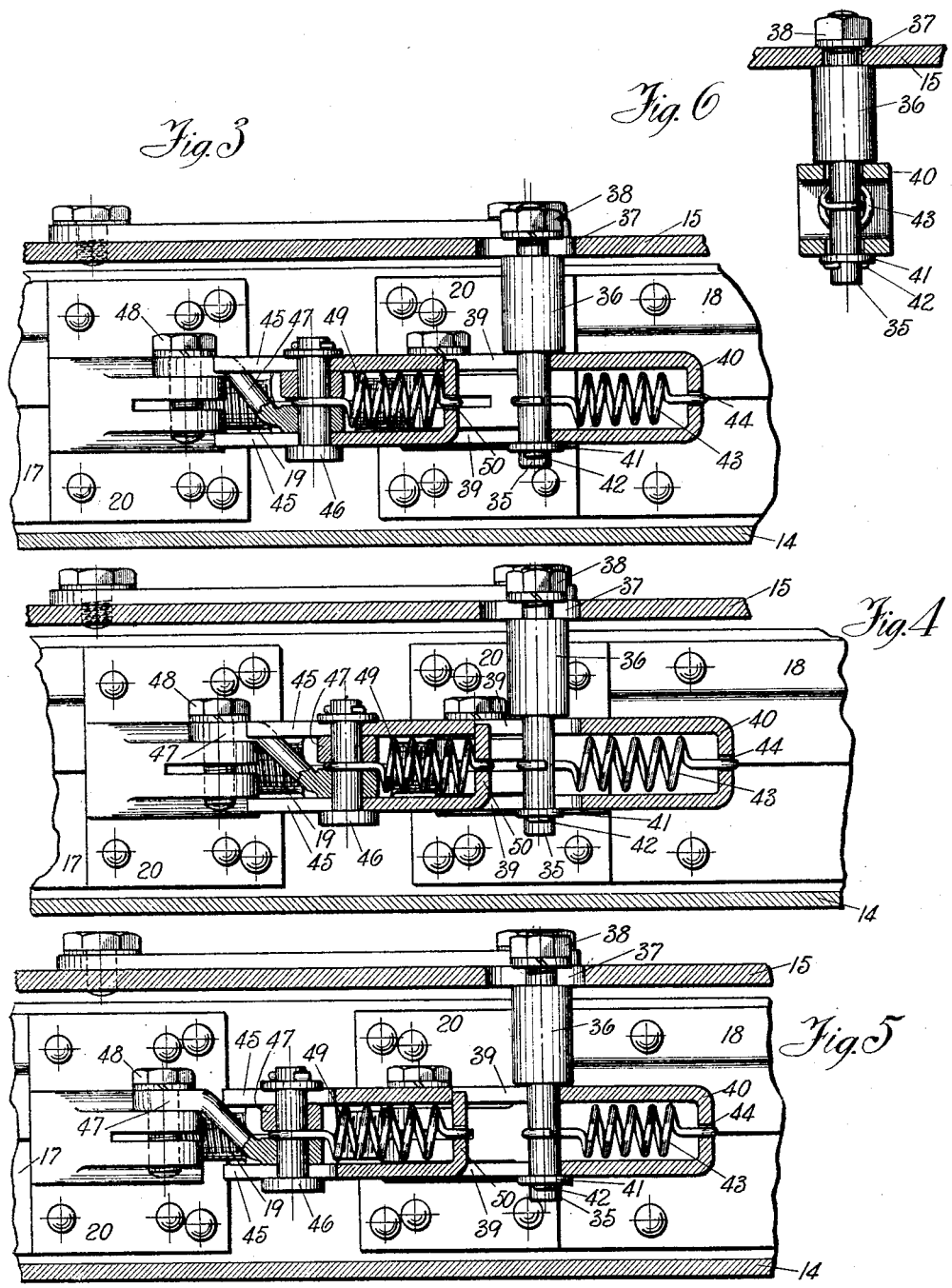

Patented Feb. 7, 1933

1,896,991

UNITED STATES PATENT OFFICE

ANDREW P. WISNER, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed January 24, 1929. Serial No. 334,707.

This invention relates to vehicle brakes and particularly to brakes of the internal servo or self-energizing type, the principal object being to provide a servo brake with a new and novel means for centering the brake element in respect to the brake drum.

Another object is to provide a self-energizing brake with spring controlled means for centering the brake element relative to the brake drum regardless of the direction in which the brake element has moved.

A further object is to provide a self-energizing brake with means for centering the brake element relative to the brake drum, comprising a tension spring for centering the brake element when it has moved in one direction, and a second tension spring for centering the same when it has moved in the opposite direction.

These being among the objects of the present invention the same consists of certain features of construction and combinations of parts to be hereinafter described with reference to the accompanying drawings and then claimed, having the above and other objects in view.

In the accompanying drawings, which illustrate a suitable embodiment of the present invention, Figure 1 is a section through the left front wheel brake of a motor vehicle taken just inside the brake drum head to show the brake shoes and cooperating mechanism in elevation.

Figure 2 is a plan view showing the actuating means for the brake operating mechanism.

Figure 3 is a section taken on the line 3—3 of Figure 1, showing the centering device for the brake element.

Figure 4 is a section similar to Figure 3, showing the position of the centering device when the brake element has moved in an anti-clockwise direction.

Figure 5 is a section similar to Figure 3, showing the position of the brake element when it has moved in a clock-wise direction.

Figure 6 is a section taken on the line 6—6 of Figure 1, showing the anchor pin for the centering device.

The brake chosen for illustration is similar to the one shown and described in detail in an application for patent by Robert F. Kohr, Serial No. 334,733 filed on even date herewith. Therefore, the brake construction will only be generally described herein as the same forms no part of my invention except in so far as the design shown is adaptable for use with my brake centering device.

Referring to the accompanying drawings in which like numerals refer to like parts throughout the several views, a steering knuckle 10 is pivoted to an end of the front axle 11 by a conventional king pin 12. The steering knuckle 10 is formed with a stub axle 13 upon which the vehicle wheel and brake drum 14 are rotatably mounted. A dust cover or backing plate 15 forming the sole support for the brake mechanism is secured to the steering knuckle by bolts 16 in adjacent relationship to the open end of the drum 14 to exclude as much dirt and foreign matter as possible. Two brake shoes 17 and 18 are concentrically arranged within the brake drum 14 and are rigidly connected together at one pair of their adjacent ends by means of a double-ended, oppositely-threaded adjusting screw 19, the ends of which are threaded into brackets 20 secured to the shoes 17 and 18. The other ends of the shoes 17 and 18 abut against a stop member 21 secured to the backing plate 15, and are normally held in contact therewith out of engagement with the brake drum 14 by coil springs 22. The brake shoes 17 and 18 are operated by links 23 and 24 which are respectively pivoted thereto and which are interconnected by an operating bar 25. A bell crank 26 pivoted to the backing plate 15 has one arm pivoted by means of a pin 27 to the bar 25 intermediate its ends, and has its other arm engaged with the free end 28 of an actuating member 29 which is rotatably supported at its other end by means of a plate 30 carried by the vehicle axle 11 as is clearly shown in Figure 2. The actuating member 29 is hingedly supported intermediate its ends by a projection 31 which is pivoted by means of a pin 32 to a support 33 also carried by the axle 11. The center lines of the pin 32 and supported end of the actuating member 29 lie substantially on the same axis, so that when the actuating member 29 is moved by a rocker arm 34 connected with a foot pedal or other means not shown, the free end 28 of the same swings through an arc, and causes the bell crank 26 to pivot, thereby moving the brake shoes 17 and 18 into engagement with the brake drum 14.

The brake element comprising the brake shoes 17 and 18, is of the servo or self-energizing type, and consequently has a rotational movement with the drum 14 when engaged therewith to give greater braking action. The springs 22 or similar means, which normally hold the brake shoes 17 and 18 out of engagement with the brake drum 14 have been found to be insufficient to self center the brake element in respect to the brake drum 14 after the brakes have been applied.

The present invention aims to insure a positive means for self-centering the brake element. In Figures 1 and 3 this means is shown in non-operative position, that is, the brake shoes 17 and 18 are out of engagement with the brake drum 14 and are centered in respect thereto. As shown in these views, a pin 35 having an enlarged central portion 36 intermediate its ends extends through an elongated opening 37 in the backing plate 15 and is securely held therein by a nut 38 threaded on the pin 35, which draws one end of the enlarged portion firmly against the backing plate 15. The free end of the pin 35 extends through slots 39 formed in the legs of a U-shaped member 40, and is held thereon by a washer 41 and cotter pin 42, the end face of the enlarged portion 36 forming a guide for the U-shaped member 40. A tension spring 43 is preferably positioned between the legs of the U-shaped member 40, one end being hooked around the pin 35 and the other end being hooked through an opening 44 in the base of the member 40.

The free ends of the legs of the member 40 are formed with notches 45 which slidably receive a pin 46. Two links 47 are pivoted on the pin 46 and the other ends of the same are attached to the brackets 20 by the bolts 48 which clamp the brackets 20 about the threaded ends of the adjusting screw 19. One end of a coil spring 49 is hooked around the pin 46 and the other end is hooked through an opening in a tongue 50, formed by bending the metal pressed out in forming the slot 39 in one of the legs of the member 40, until it seats against the end of the other slot 39 substantially as shown in Figure 3. Two eccentric spools 51 rotatably carried by the backing plate 15 which contact with plates 52 secured to the brake shoes 17 and 18 are provided for adjusting the same.

The operation of the centering device just described is very simple and efficient. Movement of the bell crank 26 exerts a pulling force on the operating bar 25, which force is transmitted to the brake shoes 17 and 18 by the links 23 and 24 respectively. The movement of the bar 25 first causes the complete brake element to bodily shift without expanding, until a portion of the same opposite the free ends thereof engages the brake drum 14.

Considering the brake drum as rotating in a counter clockwise direction, the brake element after being moved bodily of the drum 14 rotates therewith until the brake shoe 18 engages the drum 14, the free end of both shoes remaining in contact with the stop member 21 during this rotational movement. Further movement of the operating bar 25 then causes the link 23 to move the brake shoe 17 away from the stop member 21 into complete engagement with the brake drum 14. The brake shoe 18 in moving from the inoperative position shown in Figure 1 to completely engaged operative position causes the centering device to assume the position shown in Figure 4 which forces the pin 46 to move the U-shaped member 40 relative to the stop pin 35 thereby increasing the tension of the spring 43. As soon as the braking pressure is released, the coil spring 43 anchored around the fixed pin 35 draws the brake shoe 18 back to normal position, and the springs 22 likewise draw the ends of the shoes 17 and 18 back into engagement with the stop member 21.

When the brake drum 14 is rotating in a clockwise direction, the brake shoes 17 and 18 are moved bodily of the drum 14 in the same manner as previously described, after which the shoe 17 is engaged with the drum 14 prior to engagement of the shoe 18. When the brake element rotates with the drum in a clockwise direction, the centering device assumes the position shown in Figure 5. The anchor pin 35 holds the U-shaped member 40 against movement in the general direction of rotation of the drum 14, and the pin 46, therefore, slides in the notches 45, thereby increasing the tension of the spring 49. The spring 49 returns the pin and consequently the brake shoes 17 and 18 to normal position as soon as the braking pressure is released.

The slot 37 is provided in the backing plate 15 so that when the brake element is in inoperative position, the pin 35 may be set so that it will contact with the end of the slots 39 in the U-shaped member substantially as shown in Figures 1 and 3.

It is apparent from the drawings and foregoing described that a self-centering device is provided for a servo brake which is very efficient in its operation and which will always return the brake shoes to inoperative position in exact concentric position relative to the drum.

It is to be understood, however, that formal changes may be made in the specific em-

What I claim is:

1. A brake comprising, a rotatable drum, a brake element, and means for moving said brake element into engagement with said drum, having in combination therewith, means for centering said brake element relative to said drum comprising a pivot pin and a spring controlled member slidable thereon movable in the general direction of said brake element when the same is engaged with said drum and movable in the opposite direction when the brake element is released from said drum to automatically return said brake element to its initial position.

2. A brake comprising, a rotatable drum, a brake element, and means for moving said brake element bodily of said drum into initial engagement therewith and then expanding said brake element into complete engagement therewith, having in combination therewith, means including a stationary pin and a member slidable thereon for centering said brake element relative to said drum, said member being movable in the general direction of said brake element as it is expanded and movable in the opposite direction when the brake element is released from said drum to automatically return said brake element to its initial position.

3. A brake comprising, a rotatable drum, a backing plate adjacent thereto, a brake element, and means for moving said brake element into engagement with said drum, having in combination therewith, means for centering said brake element relative to said drum including, a pin supported by said backing plate, a member movable on said pin, a pin slidable in said member, a connection between said last named pin and brake element, and spring means connected with said pins and member.

4. A brake comprising, a rotatable drum, a backing plate adjacent thereto, a brake element, and means for moving said brake element into engagement with said drum, having in combination therewith, means for centering said brake element relative to said drum including, a pin supported by said backing plate, a member slidable on said pin, a pin slidable in said member, a connection between said last named pin and brake element, a spring connected with said first named pin and member for returning said brake to its inoperative position when said brake element has been moved in one direction, and a spring connected with said last named pin and member for returning said brake element to its inoperative position when said brake element has been moved in another direction.

5. A brake comprising, a rotatable drum, a backing plate adjacent thereto, a brake element, and means for moving said brake element into engagement with said drum, having in combination therewith, means for centering said brake element relative to said brake drum including, a pin supported by said backing plate, a member having a plurality of slots therein, said pin being slidably received in one of said slots, a pin slidable in the other of said slots, a connection between said last named pin and brake element, a spring connected with said first named pin and member for returning said brake element to its inoperative position when said brake element has been moved in one direction, and a spring connected with said last named pin and member for returning said brake element to its inoperative position when said brake element has been moved in another direction.

Signed by me at South Bend, Indiana this 21st day of January 1929.

ANDREW P. WISNER.